Jan. 22, 1924.
A. J. HODGE
1,481,509
TABLE BUSHING
Filed March 10, 1923
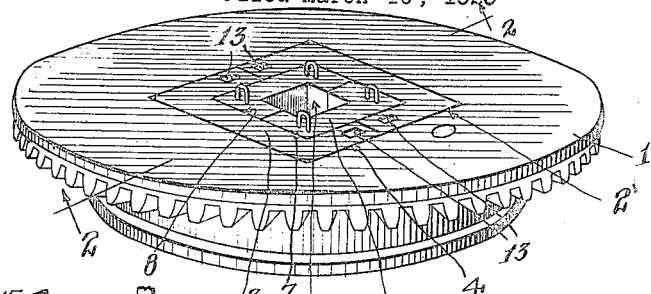
Fig. 1
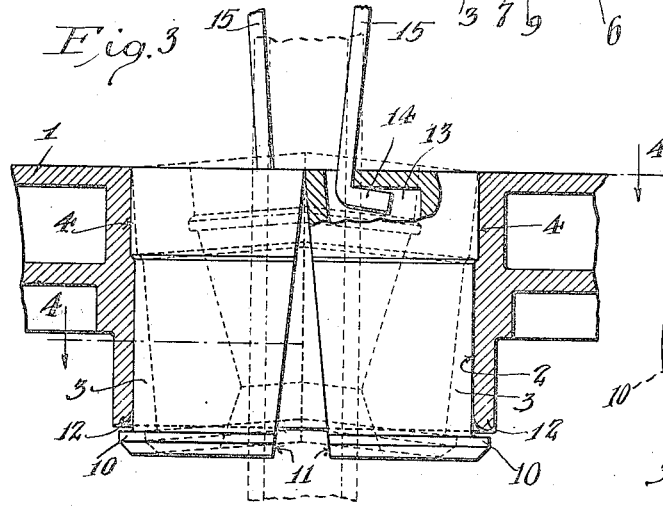
Fig. 3
Fig. 2
Fig. 6
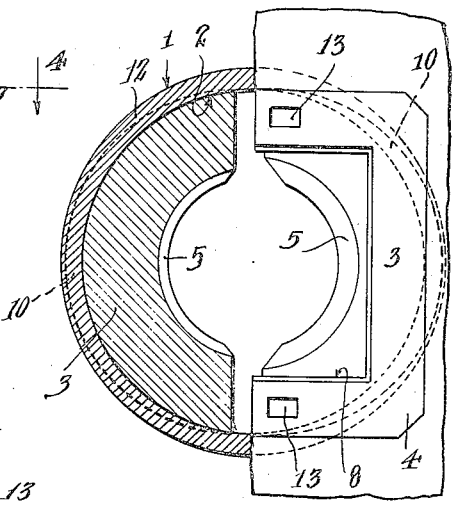
Fig. 4
Fig. 5
Inventor
Arthur J. Hodge
By Lyon & Lyon attys.

Patented Jan. 22, 1924.

1,481,509

UNITED STATES PATENT OFFICE.

ARTHUR J. HODGE, OF LOMITA, CALIFORNIA, ASSIGNOR TO UNION TOOL COMPANY, OF TORRANCE, CALIFORNIA, A CORPORATION OF CALIFORNIA.

TABLE BUSHING.

Application filed March 10, 1923. Serial No. 624,172.

*To all whom it may concern:*

Be it known that I, ARTHUR J. HODGE, a citizen of the United States, residing at Lomita, in the county of Los Angeles and State of California, have invented a new and useful Table Bushing, of which the following is a specification.

This invention relates to table bushings for rotary drill tables and has for an object to provide an improved type of split table bushing in which the opposed bushing members are retained against vertical displacement until first tilted to disengage the retaining means, and in which the opposed diametric surfaces of the members are angled away from each other to permit such tilting.

A further object is to provide a split table bushing of the above character having means near the diametric surfaces for engagement by lifting tackle whereby during a lifting of the members they will tilt by gravity.

Another object is to provide a split table bushing adapted to receive drill stem bushings and having means cooperating with the table to prevent a displacement of the table bushing members until first tilted to disengage said means, with the drill stem bushings positively locking the table bushing members against tilting, whereby the drill stem bushings must be first removed and the table bushing members then tilted before removal from the table.

Various other objects and advantages will be more fully apparent from the following description of the accompanying drawings, which form a part of this disclosure, and which illustrate a preferred form of embodiment of the invention.

Of the drawings:

Figure 1 is a perspective view of the drill table accommodating my improved table bushings.

Fig. 2 is an enlarged detail section on line 2—2 of Fig. 1.

Fig. 3 is a similar section showing the table bushings in elevation and illustrating in dotted lines their tilted positions.

Fig. 4 is a plan section on line 4—4 of Fig. 3.

Fig. 5 is a perspective view of one of the table bushing members, and

Fig. 6 is a perspective view of a tackle member or lifting hook adapted for use in the removal of the table bushing members.

In the drawings, 1 designates the rotary drill table which may be of any well known or standard design, said table having the usual central bore 2 to receive the split table bushings.

The table bushings of the present invention comprise two opposed members 3 each forming one-half of a concentric bushing adapted to seat within the bore 2 of the table and having at their upper ends, squared shoulders or flanges 4 countersunk into the table surface to prevent their turning in the bore, and to limit their insertion therein.

The table bushing members 3 have curved inner surfaces 5, with said curved surfaces of both members cooperating to form a central tapered throat to receive drill stem bushing members 6. The members 6 have squared flanges or shoulders 7 at their upper ends, the upper surfaces of the members 3 having squared recesses 8 to receive said flanges 7 of the drill stem bushing to keep them from turning. These drill stem bushings 6 are of standard type having a square bore 9 to receive the drill stem, and are positioned normal to the position of the table bushings 3, as shown in Fig. 1.

Each member 3 has at its lower end an abutment 10 on its outer periphery and in the present instance such abutment takes the form of a lip which is preferably eccentric to the bushings. These abutments each engage beneath an under surface 12 of the table and prevent a vertical displacement of the bushing members 3 from normal position.

The diametric surfaces 11 of the two bushing members 3 engage each other at the top surface to prevent lateral displacement of said members, and are angled downwardly and outwardly to provide clearance permitting a tilting of one or both of said members from normal position, to the position shown in dotted lines in Fig. 3. By so tilting either bushing member 3 its abutment 10 is removed from beneath the table surface 12 and said member 3 may then be removed from the table bore.

It will be evident, however, that while the drill stem bushings 6 are in place it will be impossible to tilt the table bushing members 3, and that the bushings 6 serve as a means of positively locking the table bushings 3 in normal position.

To facilitate a removal of the table bushing members 3 they are provided with means adjacent the diametric surfaces 11 for engagement by suitable lifting tackle, such means in the present instance comprising recesses or pockets 13 into which the hooked ends 14 of a lifting bail 15 may engage. As the pockets 13 are inwardly of the center of gravity of the respective bushing members 3, it will be evident that upon being elevated they will tilt by gravity. The lower portion of the surfaces 5 are relieved as at 16 to guide abutments on the drill pipe (such as the pipe couplings) towards the center of the bushing when the drill pipe is being raised.

While the form of mechanism herein illustrated and described is well adapted to fulfill the purposes primarily stated, it is to be understood that I do not wish to limit the invention to the one form of embodiment herein disclosed, for it is susceptible of embodiment in various other forms, all coming within the scope of the following claims.

I claim:

1. In a device of the nature disclosed, the combination of a rotary drill table having a vertical bore, and opposed split coengaging table-bushing members adapted to seat within said bore and engage beneath an under surface of the table to prevent a vertical displacement of said members from normal position, the opposed diametric surfaces of the members being angled downwardly and outwardly to permit a tilting of one or both of the members from beneath said under surface of the table whereby said members may subsequently be removed.

2. In a device of the nature disclosed, the combination of a rotary drill table having a vertical bore, and opposed split coengaging table-bushing members adapted to seat within said bore and having abutments engaging beneath an under surface of the table to prevent a vertical displacement of said members from normal position, the opposed diametric surfaces of the members being angled downwardly and outwardly to permit a tilting of one or both of the members and a disengagement of their abutments from beneath said under surface of the table whereby said members may subsequently be removed.

3. In a device of the nature disclosed, the combination of a bore, and opposed split co-engaging table-bushing members adapted to seat within said bore and having opposed diametric surfaces angled downwardly and outwardly to permit a tilting of one or both of the members, each member having an abutment positioned on its lower outer periphery and interlocking with the table to prevent a removal of said member from the table bore until first tilted to disengage said abutment.

4. In a device of the nature disclosed, the combination of a rotary drill table having a vertical bore, and opposed split coengaging table-bushing members adapted to seat within said bore and having opposed diametric surfaces angled downwardly and outwardly to permit a tilting of one or both of the members, each member having an eccentric abutment lip extending outwardly from the lower portion of its outer periphery and normally engaging beneath an under surface of the table to prevent a removal of said member from the table bore until first tilted to disengage said lip from beneath said under surface of the table.

5. In a device of the nature disclosed, the combination of a rotary drill table having a vertical bore, and opposed split coengaging table-bushing members having opposed diametric surfaces angled downwardly and outwardly to permit a tilting of one or both members, each member having an abutment positioned on its lower outer periphery and engaging beneath an under surface of the table to prevent a displacement of the member from normal position, the upper surface of each member being provided with means adjacent its diametric surface for engagement by lifting tackle whereby during a lifting of the members they will tilt by gravity to disengage said abutments from beneath the said under surface of the table.

6. A split table bushing member for rotary drill tables, comprising a body forming a section of a concentric bushing and having a shoulder limiting its insertion into a table bore and a diametric surface angled downwardly and towards the body, the lower portion of the outer periphery of the body having an abutment substantially normal to the axis of the table bore and adapted to engage beneath an under surface of the table.

7. In a device of the nature disclosed, the combination of a rotary drill table having a vertical bore, opposed split coengaging table-bushing members adapted to seat within said bore and engage beneath an under surface of the table to prevent a vertical displacement of said members from normal position, the opposed diametric surfaces of the members being angled downwardly and outwardly to permit a tilting of one or both of the members from beneath said under surface of the table whereby said members may be subsequently removed, said table-bushing members providing a central bore, and drill-stem bushings adapted to seat in said central bore to positively lock the table-bushing members against tilting.

8. In a device of the nature disclosed, the combination of a rotary drill table having a vertical bore, split co-engaging table bushing members adapted to seat within said bore and provided with abutments so disposed as to engage beneath portions of the rotary drill table to prevent a vertical displacement of said members from normal position, the opposed diametric surfaces of the members so relieved as to permit a tilting of one or both members causing said abutments to disengage with the table thus permitting said members to be removed, said table bushing members provided with a central opening suitable to receive subsequent bushings which when seated prevent the tilting of the table bushings thus positively locking the table bushing members to the table.

Signed at Torrance, Cal., this 28th day of Feby., 1923.

ARTHUR J. HODGE.